No. 644,211.　　　　　　　　　　　Patented Feb. 27, 1900.
J. W. McKEE.
REVERSING MECHANISM.
(Application filed Oct. 28, 1899.)

(No Model.)

Witnesses.

Inventor
James W. McKee
By Kay & Totten
Attorneys.

UNITED STATES PATENT OFFICE.

JAMES W. McKEE, OF BUTLER, PENNSYLVANIA.

REVERSING MECHANISM.

SPECIFICATION forming part of Letters Patent No. 644,211, dated February 27, 1900.

Application filed October 28, 1899. Serial No. 735,110. (No model.)

*To all whom it may concern:*

Be it known that I, JAMES W. MCKEE, a resident of Butler, in the county of Butler and State of Pennsylvania, have invented a new and useful Improvement in Reversing Mechanism; and I do hereby declare the following to be a full, clear, and exact description thereof.

My invention relates to reversing apparatus, its object being to provide a reversing apparatus specially suitable for gas-engines, though it can be employed with advantage in connection with other engines or power-driven mechanism. Its object is to provide a quick reverse requiring no gearing, in which the parts will require but slight movement, and which movement can be under the control of a lever operated from a distance—such, for example, as the ordinary reversing-levers of engines for drilling and pumping Artesian wells.

It consists, generally stated, in a reversing mechanism having a power-driven wheel, a loosely-mounted reversing-wheel contacting therewith, and a band-wheel mounted on an eccentric-shaft and having an inner bearing-face adapted to be drawn into contact with either the power-wheel or the reversing-wheel, so as to take its motion from one or the other wheel, according to the direction of the movement required.

It also consists in certain other improvements, which will be hereinafter more particularly set forth and claimed.

To enable others skilled in the art to make and use my invention, I will describe the same more fully, referring to the accompanying drawings, in which—

Figure 1:
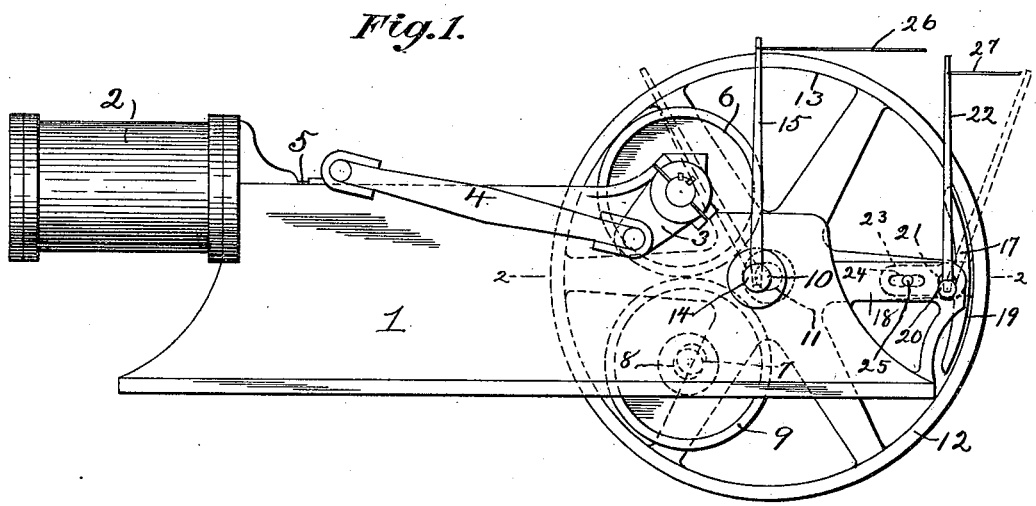
Figure 3:
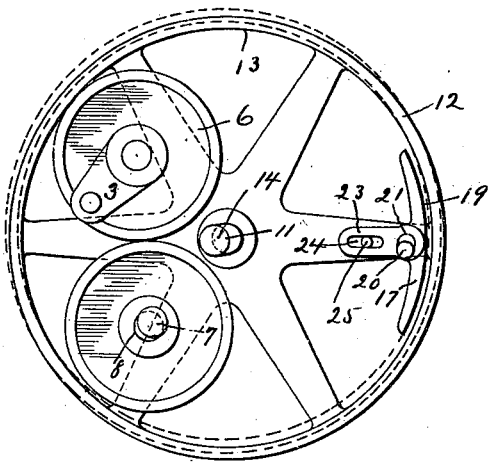
Figure 2:
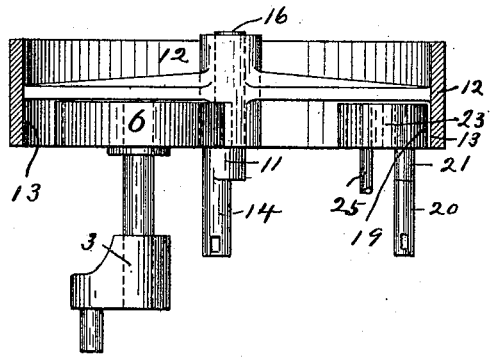

Figure 1 is a side view of a gas-engine provided with the reversing mechanism. Fig. 2 is a horizontal section on the line 2 2, Fig. 1; and Fig. 3 is a diagrammatic view showing the position of the parts in reversing.

The drawings show the gas-engine having the bed or frame 1, the cylinder 2, and the crank-shaft 3, driven by the pitman 4, connected to the piston-rod 5. The crank has secured thereto and turning therewith the power-driven wheel 6, which has a smooth or frictional face, power being imparted from this wheel either for direct driving or reverse driving, as hereinafter described.

Mounted in the bearing 7 in the frame 1 is the shaft 8, which carries a reversing-wheel 9 loosely mounted thereon, this reversing-wheel contacting with the driving-wheel 6, as shown. The shaft 8 is preferably mounted eccentrically in the bearing 7, as indicated by dotted lines, so that in case of wear of either the driving-wheel 6 or the reversing-wheel 9 the position of the shaft 8 may be set so as to hold the frictional faces in proper contact, the shaft 8 being first adjusted and then locked in the proper position.

Mounted in the bearing 10 of the frame 1 is the shaft 11, which carries the band-wheel 12. I have termed it a "band-wheel," though it is evident that it may be formed as a cog-wheel, sprocket, or of other form to transmit power. This wheel 12 has the inner bearing-face 13 extending laterally over the bearing-faces of the wheels 6 and 9, so that when the band-wheel 12 is drawn into contact with either wheel it will take its motion therefrom through the frictional contact of the outer face of the driving or reversing wheel with the inner bearing-face 13 of the band-wheel. The shaft 11 is what I term an "eccentric-shaft" having a set therein, as shown in dotted lines, the drawings showing this eccentric or set to be about one-half the thickness of the shaft. This can of course be varied from an ordinary crank to an eccentric and with whatever throw is desired. The portion 14 of the shaft 11 extends through the bearing 10 in the bed 1 and carries the reversing-lever 15, which is rigidly secured thereto, while the portion 16 of the shaft 11 forms a bearing for the band-wheel 12, that band-wheel being mounted concentrically on such portion 16 of the shaft 11. It will be evident that, as illustrated in the drawings, by drawing the lever 15 to the right the band-wheel will be drawn down into contact with the driving-wheel 6, while by throwing the lever in the opposite direction the band-wheel will first be drawn out of contact with both wheels and then into contact with the reversing-wheel 9, when it will receive its power through the driving-wheel 6 and reversing-wheel 9 and be driven in the opposite direction.

Where the engines are used for oil-well purposes, it is desirable to provide a brake, so as to control the lowering of the tools, lines, &c., into the well, and to provide the same I take advantage of the inner bearing-face 13 of the band-wheel, mounting the brake 17 upon the bed 1 or upon an extension 18 thereof, the brake 17 having a long curved or continuous bearing-face 19 to contact with the face 13 of the band-wheel and being mounted within the same in any suitable way, that shown being as follows: Mounted in the extension-bearing 18 is the eccentric-shaft 20, one section 21 of which is mounted in the forward end of the brake 17, the brake-lever 22 being connected to said shaft, so that by drawing upon the same the brake 17 will be thrown against the band-wheel, the brake having the extension 23, provided with the guiding-slot 24, fitting over a guide-pin 25 on the extension-bearing 18.

In the use of the invention, as above generally described, the engine is driven continuously in one direction, the power being imparted to the pitman 4 and the crank-shaft 3 to the driving-wheel 6, turning that in one direction, while the reversing-wheel 9 is driven in the opposite direction. When the operator desires to drive the engine in the direct or regular course, he draws the lever 15 forward, (which can of course be accomplished by means of a rod 26 when the engine is used for oil-well purposes,) the turning movement of the eccentric-shaft 11 and band-wheel is swung down, and this draws the face of the driving-wheel 6 and the inner bearing-face of the band-wheel 13 into contact, causing the band-wheel to rotate in the same direction as the driving-wheel 6 is turned. In case it is desired to stop the motion the lever 15 is drawn into mid-position, leaving the wheels 6 and 9 free to turn, and again by drawing the lever 15 over to the left through the eccentric-shaft 11 the band-wheel is raised into contact with the reversing-wheel 9 and is rotated with it. In case of wear of either the driving-wheel 6 or the reversing-wheel 9, the reversing-wheel, through its eccentric-shaft 8, can be set up into contact with the driving-wheel 6, and its shaft can lock in position. The movement of the band-wheel in order to bring it into contact either with the driving or reversing wheel may be extremely slight, such as will not affect the grip or hold of the belt upon the band-wheel. In case it is desired to employ the band-wheel for controlling the lowering of tools in wells or like purposes the controlling-lever 15 is set in mid-position, and by drawing upon the brake-lever 22, such as by the rod 27, the brake 17 can be thrown into contact with the inner face of the band-wheel and the brake applied.

As there may be considerable strain brought upon the band-wheel, which might affect the position of the controlling or reversing lever 15, it is to be noted that the eccentric-shaft 11 is set on the same horizontal plane as the brake 17, so that the natural strain of the brake upon the inner bearing-face of the band-wheel will tend to hold the band-wheel from contact with either driving or reversing wheel, and therefore the braking action will naturally prevent contact of the band-wheel with either the driving or reversing wheel.

The apparatus is simple in construction. It provides for easy control, while permitting the driving of the engine crank-shaft in one direction at all times and doing away with the usual reversing mechanism. It is compact, while permitting of broad bearing-faces, as its flange or bearing-face 13 and the outer friction-faces of the wheels 6 and 9 may be of considerable width, giving contact necessary for any driving purposes, according to the natural use to which the engine is to be applied. At the same time the reversing action can be obtained in an ordinary band-wheel or wheel from the outer face of which the power is taken, while for oil-well and like purposes the braking mechanism can be applied to this band-wheel through the same bearing-face to which the driving power is applied.

What I claim as my invention, and desire to secure by Letters Patent, is—

1. In a reversing mechanism, a power-driven wheel, a loosely-mounted reversing-wheel contacting therewith and a band-wheel having an inner bearing-face extending over said driving and reversing wheels and so mounted as to be drawn into contact with one or the other wheel, substantially as set forth.

2. In a reversing mechanism, the combination of a power-driven wheel, a loosely-mounted reversing-wheel contacting therewith and a band-wheel mounted on a crank-shaft and having an inner bearing-face extending over the driving and reversing wheels and adapted to be drawn into contact with one or the other, substantially as set forth.

3. In a reversing mechanism, the combination of a bed or frame, a power-driven wheel mounted therein, an adjustable bearing supported in the frame, a loosely-mounted reversing-wheel carried by said frame and contacting with the driving-wheel, and a band-wheel having an inner bearing-face extending over the driving and reversing wheels and adapted to be drawn into contact with one or the other, substantially as set forth.

4. In a reversing mechanism, the combination of a bed or frame, a power-driven wheel mounted therein, an adjustable bearing formed of an eccentric-shaft mounted in said frame, a reversing-wheel loosely mounted on such adjustable bearing and a band-wheel having an inner bearing-face extending over the driving and reversing wheels and adapted to be drawn into contact with one or the other, substantially as set forth.

5. In a reversing mechanism, the combination of a bed or frame, a power-driven wheel mounted therein, a loosely-mounted reversing-wheel contacting with the power-driven wheel and a band-wheel having an inner bearing-face extending over said wheels and adapted to be drawn into contact with one or the other, and a brake mounted on the frame and adapted to contact with the inner bearing-face of the band-wheel.

In testimony whereof I, the said JAMES W. MCKEE, have hereunto set my hand.

JAMES W. MCKEE.

Witnesses:
GRACE C. RAYMOND,
ROBERT C. TOTTEN.